United States Patent [19]

Furuta

[11] Patent Number: 5,394,279

[45] Date of Patent: Feb. 28, 1995

[54] METHOD AND APPARATUS FOR SIMULTANEOULSY SEARCHING TWO SIDES OF A TAPE FOR LOCATIONS OF BLANKS BETWEEN RECORDED SIGNALS

[75] Inventor: Yoshiki Furuta, Saitama, Japan

[73] Assignee: Pioneer Electronic Corporation, Tokyo, Japan

[21] Appl. No.: 255,803

[22] Filed: Jun. 7, 1994

Related U.S. Application Data

[63] Continuation of Ser. No. 892,770, Jun. 3, 1992, abandoned.

[30] Foreign Application Priority Data

Sep. 30, 1991 [JP] Japan ................. 3-252077

[51] Int. Cl.⁶ ............................................. G11B 5/02
[52] U.S. Cl. ..................... 360/72.1; 360/72.3; 360/75; 360/38.1; 360/63
[58] Field of Search .............. 360/72.1, 38.1, 22, 360/69, 71, 72.3, 75, 63

[56] References Cited

U.S. PATENT DOCUMENTS

| | | | |
|---|---|---|---|
| 4,228,471 | 10/1980 | Shiga | 360/73 |
| 4,290,089 | 9/1981 | Lavaleije | 360/72.1 |
| 4,323,934 | 4/1982 | Giraud | 360/61 |
| 4,342,056 | 7/1982 | Ishii et al. | 360/72.1 |
| 4,367,498 | 1/1983 | Kitamura et al. | 360/72.1 |
| 4,380,031 | 4/1983 | d'Alayer de Costemore d'Arc | 360/74.1 |
| 4,546,399 | 10/1985 | Furuta | 360/137 |
| 4,847,708 | 7/1989 | Furuyama | 369/32 |
| 5,053,898 | 10/1991 | Hashimoto et al. | 360/72.1 |
| 5,144,503 | 9/1992 | Fukushima et al. | 360/72.1 X |

FOREIGN PATENT DOCUMENTS 2-232802  9/1990  Japan .

Primary Examiner—Aristotelis Psitos
Assistant Examiner—James L. Habermehl
Attorney, Agent, or Firm—Finnegan, Henderson, Farabow, Garrett & Dunner

[57] ABSTRACT

A method of searching for blanks in a digital tape player with reduced search time by performing the operation of searching for blanks on both sides of an analog recorded tape concurrently. In a digital tape player dedicated to both analog and digital reverse playback, a reverse fixed head component is arranged so that a tape can travel both ways by reversing the fixed head component 1. The head surface of the head component is divided into two tracks and one of the tracks is provided with analog playback head sections 2 and the other track with digital playback head sections 3. In such a digital tape player, analog recorded signals on one of the tracks of the analog recorded tape are being read by the analog playback head sections 2, while analog recorded signals on the other track are being read by the digital playback head sections 3 at the same time, so that blanks on both upper and lower tracks can be searched simultaneously.

13 Claims, 6 Drawing Sheets

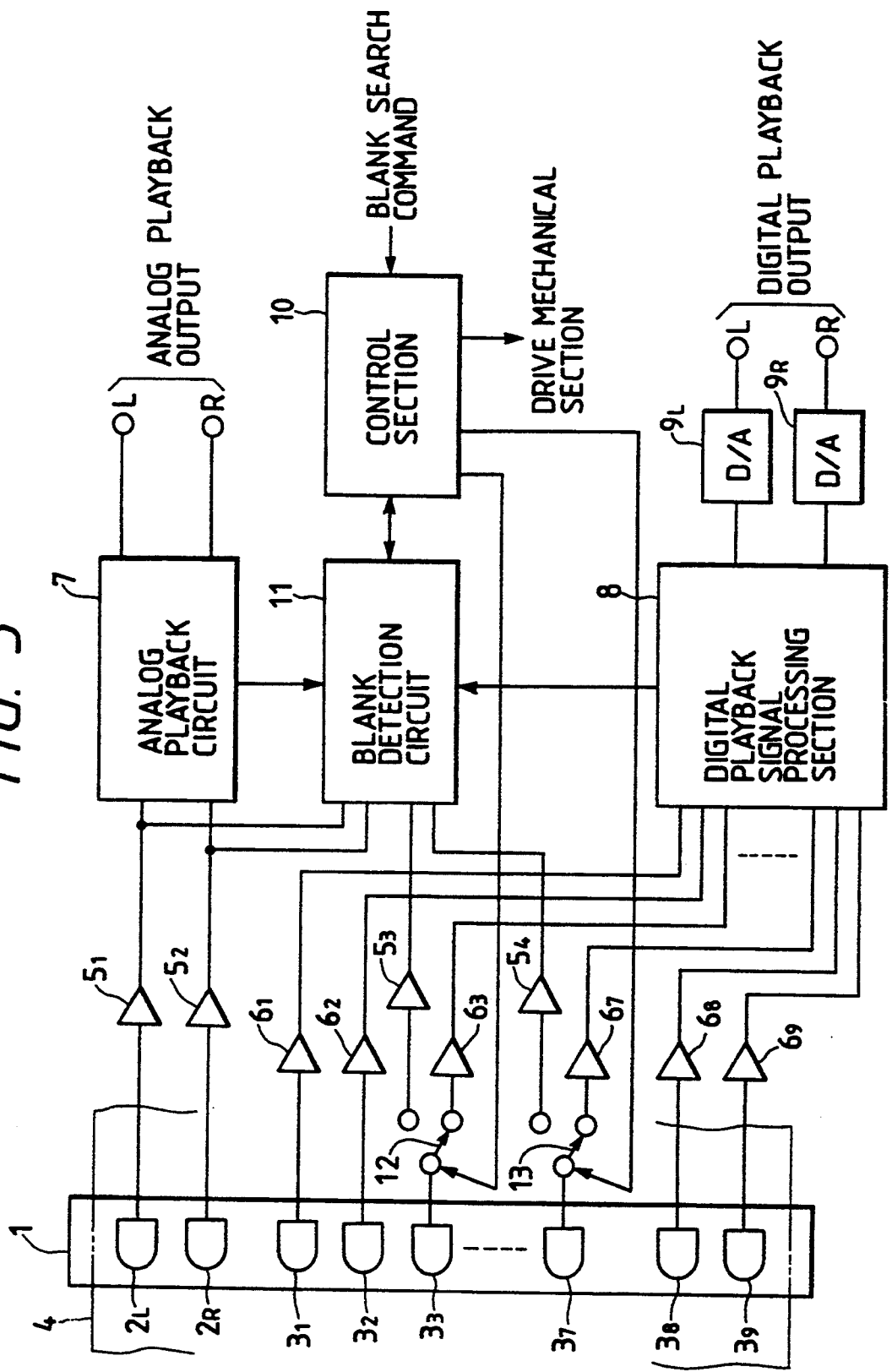

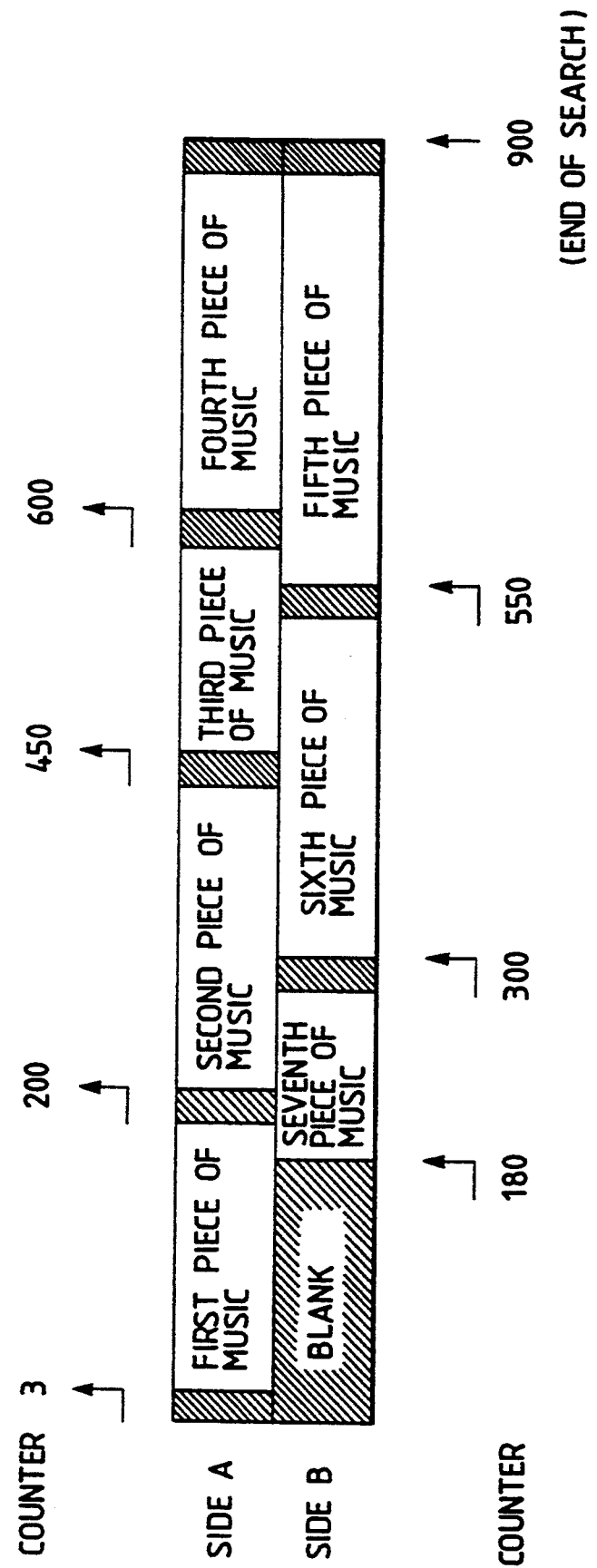

FIG. 5(A)

| | MUSIC NUMBER | COUNT |
|---|---|---|
| SIDE A | 1 | 3 |
| | 2 | 200 |
| | 3 | 450 |
| | 4 | 600 |
| | | |
| | | |
| SIDE B | 1 | 180 |
| | 2 | 300 |
| | 3 | 550 |
| | 4 | 900 |
| | | |
| | | |

FIG. 5(B)

| | MUSIC NUMBER | COUNT |
|---|---|---|
| SIDE A | 1 | 3 |
| | 2 | 200 |
| | 3 | 450 |
| | 4 | 600 |
| | | |
| | | |
| SIDE B | (1) | 180 |
| | 7(2) | 300 |
| | 6(3) | 550 |
| | 5(4) | 900 |
| | | |
| | | |

METHOD AND APPARATUS FOR SIMULTANEOUSLY SEARCHING TWO SIDES OF A TAPE FOR LOCATIONS OF BLANKS BETWEEN RECORDED SIGNALS

This application is a continuation, of application Ser. No. 07/892,770, filed Jun. 3, 1992, now abandoned.

BACKGROUND OF THE INVENTION

1. Field of the Invention

The present invention relates to a method of searching for blanks on an analog recorded tape in a tape player having a reversible fixed head section capable of reproducing both analog recorded tape and digital recorded tape signals.

2. Discussion of the Related Art

FIG. 6 shows a method of searching for blanks on an analog recorded tape in a conventional cassette tape deck or cassette tape player. Blanks on a tape have heretofore been searched by picking up recorded signals from the start to the end of side A of the tape with a playback head 61, and upon reaching the end of side A the playback head 61 is 180° reversed to similarly subject the tape to blank searching from the start to the end of side B. This is how a blank start position P has conventionally been detected.

Since the conventional blank search method must go through both sides of the tape, side A, possibly having no blanks, must be searched even if a blank to be searched is present on side B. Thus, this blank searching method is time-consuming.

SUMMARY OF THE INVENTION

The present invention has been made in view of the above circumstances. Accordingly, an object of the invention is to provide a method of searching for blanks on an analog recorded tape which can reduce search time by searching both sides A and B of the analog recorded tape concurrently.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the apparatus for detecting blanks in a tape player, comprises a reversible fixed head component having a head surface divided into first and second heads, the first head having a plurality of analog playback head sections, and the second head having a plurality of digital playback head sections, wherein the plurality of analog playback head sections and at least two of the plurality of digital playback head sections simultaneously generate signals representing the magnitude of recorded signals on both sides of the recorded tape, and blank detection means for detecting blanks in the recorded signals.

Additionally, a method of searching for blanks in a tape player comprises the steps of detecting analog recorded signals on a first side of the analog recorded tape by the analog playback head sections, simultaneously detecting the recorded signals on a second side of the recorded tape by the digital playback head sections, and detecting each blank in the recorded signals while the recorded signals are simultaneously being detected by the plurality of analog playback head sections and the plurality of digital playback head sections.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 3 is a block diagram showing an embodiment of a digital tape player constructed by applying a method in accordance with the invention;

FIG. 4 is a diagram illustrative of how a number of music pieces are detected utilizing a method in accordance with the invention;

FIGS. 5(A) and 5(B) are diagrams showing exemplary information stored in a RAM to detect the number of pieces of music.

DETAILED DESCRIPTION OF THE PREFERRED EMBODIMENTS

To achieve the aforementioned objects, the present invention is a method and apparatus of searching for blanks in a digital tape player dedicated to both analog and digital data. The digital tape player includes a reversible fixed head component. The head surface of the fixed head component is divided into two heads, one of the heads being provided with analog playback head sections, and the other head being provided with digital playback head sections. The fixed head component is reversible so that a tape can be played both ways (i.e., in two directions). In such a digital tape player, analog recorded signals on one of the tracks of an analog recorded tape are searched by the analog playback head sections, and at the same time, recorded signals on the other track are searched by the digital playback heads, so that blanks on both upper and lower tracks are searched concurrently.

Figure 2:
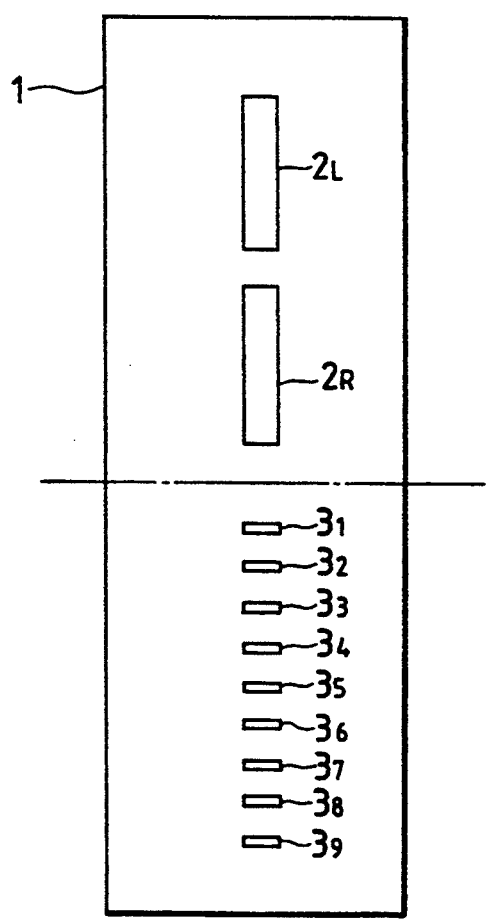
FIG. 2 is a diagram showing an exemplary structure of a fixed head section in accordance with the present invention.
Figure 6:
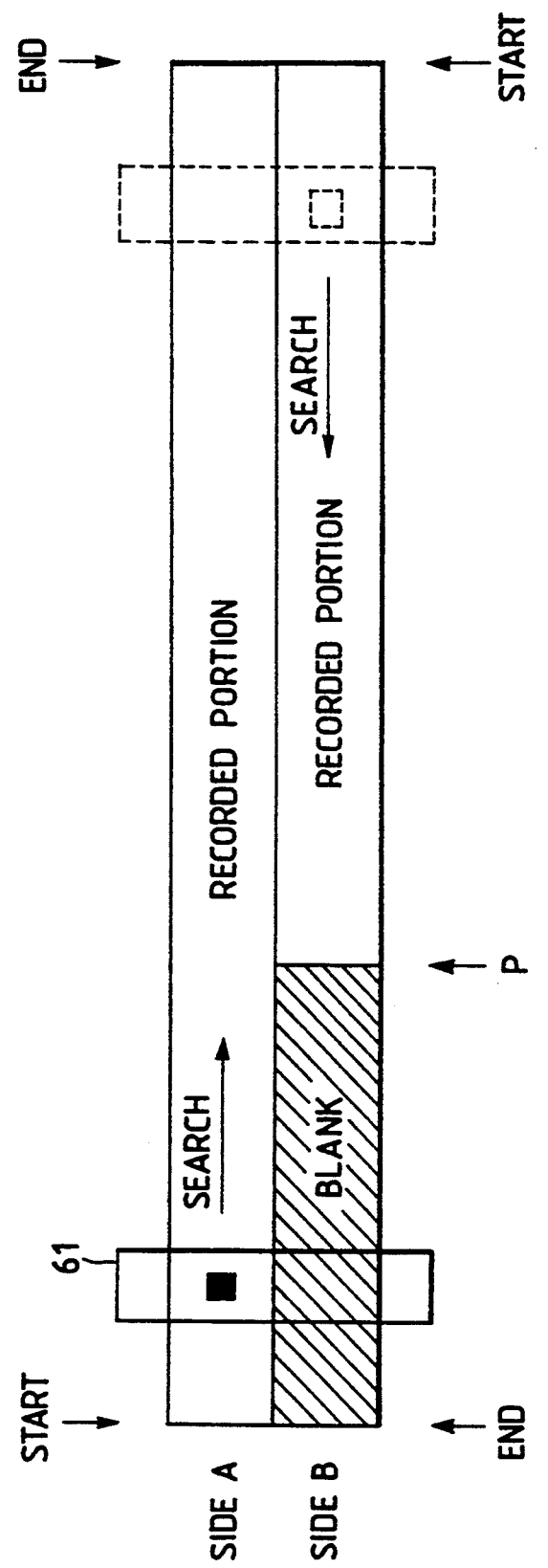
FIG. 6 is a diagram illustrative of the principle on which a conventional method of searching for blanks is based.

FIG. 2 is a diagram showing an exemplary structure of a reversible fixed head section dedicated to both analog and digital data. As shown in FIG. 2, the magnetic head surface of a fixed head component is divided into two heads, upper and lower. One of the heads (the upper side as viewed from FIG. 2) is provided with analog playback sections $2_L$, $2_R$, and the other head (the lower side) is provided with 9-channel digital playback head sections $3_1$ to $3_9$.

The fixed head component 1 is so arranged as to be 180° reversed by a reversing mechanism (not shown), so that both sides A and B of either an analog recorded tape or a digital recorded tape can be played both ways.

Figure 1:
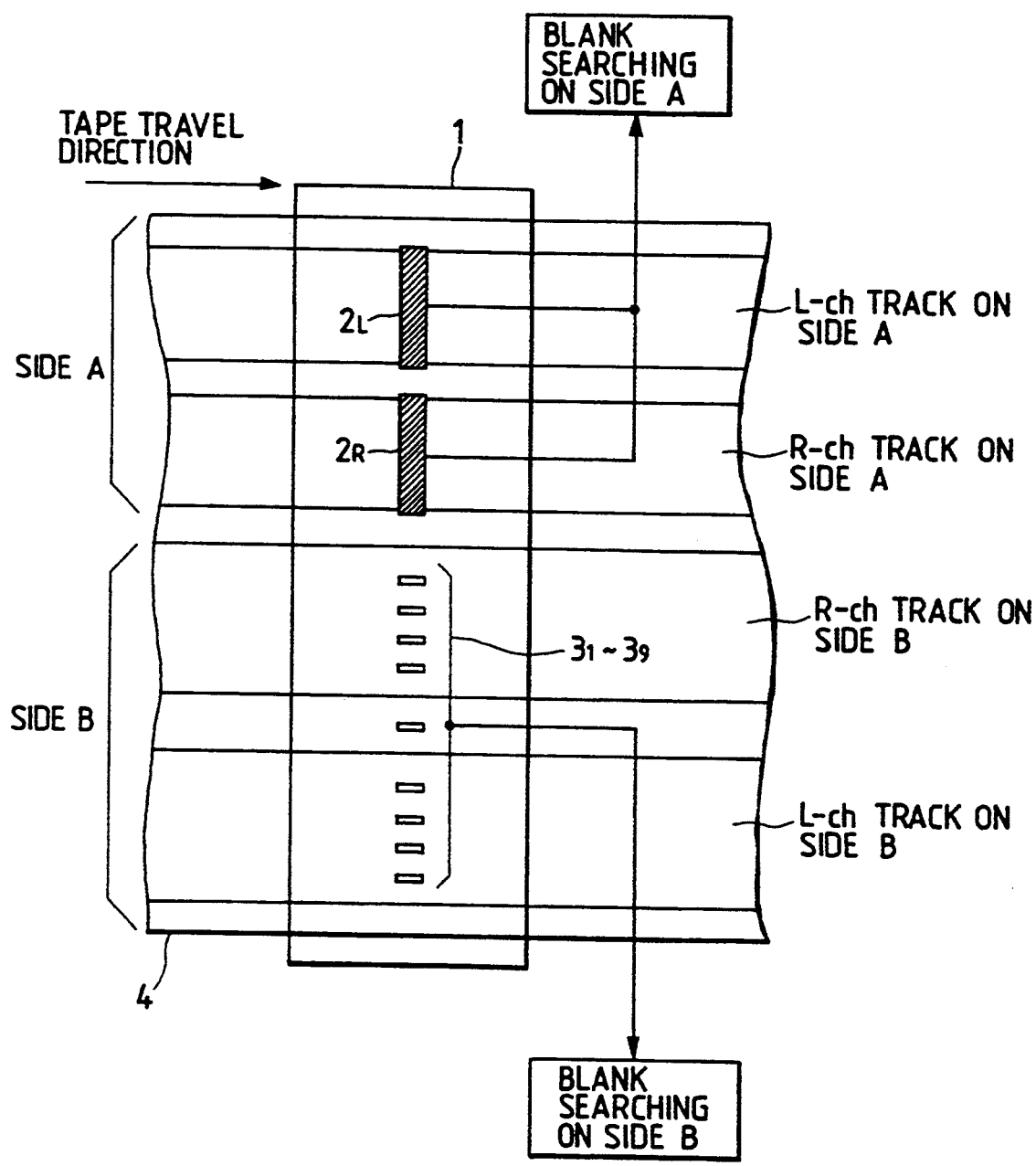
FIG. 1 is a diagram illustrative of the principle on which a method of searching for blanks in accordance with the invention is based.

As shown in FIG. 1, blanks on side A of an analog recorded tape 4 are searched by reading analog recorded signals on side A with the analog playback heads sections $2_L$, $2_R$. Simultaneously with the operation of searching side A, side B is searched by reading analog recorded signals on side B with the digital playback head sections $3_1$ to $3_9$. This technique allows blanks to be searched on condition that a boundary between a blank and a signal recorded portion on side A or B is detected. Thus, if signals are recorded also on side B, the blank search operation can be performed in about half the conventionally required time.

An embodiment of the invention will now be described with reference to the drawings.

FIG. 3 shows an embodiment of a digital tape player constructed by applying a blank search method of the invention. In FIG. 3, reference numeral 1 designates a reversible fixed head component that has the same structure as that shown in FIG. 2. On the magnetic head surface of the fixed head component 1 are analog playback head sections $2_L$, $2_R$ for left and right channels and nine (9-channel) digital playback sections $3_1$ to $3_9$.

Reference numeral 4 designates a recorded tape; $5_1$ to $5_4$, analog head amplifiers; $6_1$ to $6_9$, digital head amplifiers; 7, an analog playback circuit; 8, a digital playback signal processing section; $9_L$, $9_R$, D/A converters for right and left channels; 10, a control section that controls the entire system; and 12, 13, head amplifier selector switches.

The circuits shown in FIG. 3 are designed so that analog signals for left and right channels picked up by the analog playback sections $2_L$, $2_R$ during playback of an analog recorded tape are sent to the analog playback circuit 7 through the analog head amplifiers $5_1$, $5_2$. The circuit 7 processes the sent signals in a predetermined manner and outputs the processed signals as stereo signals from analog output terminals. Further, during playback of a digital recorded tape, the digital data picked up by the digital playback sections $3_1$ to $3_9$ in parallel are sent to the digital playback signal processing section 8 through the digital head amplifiers $6_1$ to $6_9$. The sent data are subjected to predetermined signal processing, and the processed data are converted to analog signals by the D/A converters $9_L$, $9_R$. These analog signals are then outputted as stereo signals for left and right channels.

In the thus constructed digital tape player, the operation of searching for blanks on the analog recorded tape is accomplished in the following manner.

First, the analog recorded tape 4 on which to perform a blank searching operation is installed, and a blank search start command is then sent to the control section 10 from an operation key (not shown).

The control section 10 that has received the blank search command not only switches the head amplifier selector switches 12 to 13 to the analog head amplifiers $5_3$, $5_4$, but also controls a tape forwarding mechanism (not shown) so that high-speed forwarding (e.g., 30 times the normal tape travel speed) of the analog recorded tape 4 is activated. During blank searching, muting or the like is applied to the analog playback signal processing section 7 and the digital playback signal processing section 8 if necessary.

The analog playback sections $2_L$, $2_R$ pick up analog recorded signals from both left and right channel tracks on side A of the analog recorded tape 4 that is travelling at a high speed. The playback signals in the received signals are sent to a blank detection circuit 11 through the analog head amplifiers $5_1$, $5_2$. The blank detection circuit 11 monitors the levels of the playback signals sent from the analog playback sections $2_L$, $2_R$ to thereby search for blanks on side A.

At the same time, the digital playback sections $3_3$ and $3_7$ pick up analog recorded signals from the left and right channel tracks on side B of the analog recorded tape 4 that is travelling at high speed. The playback signals in the received signals are sent to the blank detection circuit 11 through the head selector switches 12, 13. The blank detection circuit 11 monitors the levels of the playback signals sent from the digital playback sections $3_3$ to $3_7$ to thereby search for blanks on side B simultaneously with the blank search on side A.

As a result, while the analog recorded tape is travelling from the start to the end of side A, the blank searching on both sides A and B is executed concurrently. Therefore, if side B has a recording, blank searching can be completed in approximately half the conventionally required time.

While the head amplifier selector switches 12, 13 are provided only on the two digital playback sections $3_3$ and $3_7$ so that the outputs of only these two sections are sent to the blank detection circuit 11 in the above-mentioned embodiment, the selection of playback sections whose outputs are to be sent to the blank detection circuit 11 is arbitrary. The outputs of all the digital playback sections may be sent to the blank detection circuit 11.

While the above description refers to an example of a player dedicated to playback, the invention may, of course, be applied to a so-called "tape recorder" dedicated to both recording and playback.

Additionally, the above-mentioned blank search method can detect not only recording end positions but also mute positions between pieces of music. Thus, the blank search method of the invention may identify the total number of music pieces recorded on both sides A and B at high speeds. This operation is described below. Further, if the method is employed in combination with a tape counter, a number identifying a single piece of music and the start position of the piece of music can also be obtained at high speeds.

That is, assuming that blanks have been detected at such positions as shown in FIG. 4 by the blank search method of the invention, the tape counter is activated simultaneously with the blank search operation to thereby obtain the tape counts at the respective blank positions as indicated in FIG. 4. The tape counts and music numbers are stored in a storage means such as a RAM as shown in FIG. 5(A) for side A or B.

After the information of FIG. 5(A) has been collected, the music numbers on side B are renumbered from the last to the first within the storage means as shown in FIG. 5(B). It is the serial numbers assigned throughout both sides A and B by renumbering that give the total number of pieces of music recorded in the tape. In the case shown in FIGS. 4 and 5(A) and 5(B), there are a total of 7 pieces of music. The information on the total number of music pieces may be displayed on, e.g., an LCD (liquid crystal display).

As is apparent from the foregoing description, the method of searching for blanks in accordance with the present invention is characterized as reading the analog recorded signals on one of the tracks of an analog recorded tape by the analog playback head sections, while reading the analog recorded signals on the other head by the digital playback head sections at the same time, so that blanks can be searched concurrently on both upper and lower tracks. Therefore, the blank search operation can be performed on both sides A and B simultaneously while the tape is travelling only one way, thus significantly reducing the search time.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for searching for blanks on a recorded tape having first and second sides in a tape player, the first side moving in a first direction during playback of signals recorded on the first side, and the second side moving in a second direction during playback of signals recorded on the second side, the apparatus comprising:
   a reversible fixed head component having a head surface divided into first and second heads, the first head having a plurality of analog playback head sections, and the second head having a plurality of digital playback head sections, wherein the plurality of analog playback head sections and at least two of the plurality of digital playback head sections simultaneously generate signals representing magnitude of the recorded signals on both sides of the recorded tape; and
   blank detection means for detecting blanks in the recorded signals in accordance with the generated signals.

2. The apparatus of claim 1, wherein all of the plurality of digital playback head section are used for generating the signals representing magnitude of the recorded signals.

3. The apparatus of claim 1, further comprising
   a tape counter which measure the position of each blank detected on the recorded tape;
   means for activating the tape counter when the plurality of analog playback head sections and the plurality of digital playback head sections begin searching through the recorded signals;
   means for counting each blank detected by the blank detection means for each side of the recorded tape; and
   means for storing the count of each detected blank and its associated tape count position.

4. The apparatus of claim 3, further comprising means for displaying the count of each detected blank and its associated tape count position.

5. The apparatus of claim 1, further comprising:
   first connecting means for connecting at least one of the signals generated by the analog playback head sections to the blank detection means; and
   second connecting means for connecting at least one of the signals generated by the digital playback head sections to the blank detection means.

6. A method of searching for blanks on a recorded tape in a tape player having a reversible fixed head component divided into first and second sections with a plurality of analog playback head sections located on the first head and a plurality of digital playback head sections located on the second head, the recorded tape having first and second sides, the first side moving in a first direction during playback of signals recorded on the first side, and the second side moving in a second direction during playback of signals recorded on the second side, the method comprising the steps of:
   searching through recorded signals on a first side of the recorded tape by the analog playback head sections;
   simultaneously searching through recorded signals on a second side of the recorded tape by the digital playback head sections; and
   detecting each blank in the recorded signals while the recorded signals are simultaneously being searched by the plurality of analog playback head sections and the plurality of digital playback head sections.

7. The method of claim 6, further comprising the steps of:
   counting each blank detected in the recorded signals;
   tracking a position of each detected blank on the recorded signals with a tape counter; and
   storing in a memory means the count of each detected blank and its associated position as headed by the tape counter.

8. The method of claim 6, wherein the blanks in the recorded signal are detected when the recorded signals are played in a fast-forward mode.

9. A method of searching for blanks on a recorded tape having first and second sides, the first side moving in a first direction during playback of signals recorded on the first side, and the second side moving in a second direction during playback of signals recorded on the second side, the method being performed by a tape player and comprising the steps of:
   (a) searching for blanks between the signals recorded on the first side of the recorded tape; and
   (b) simultaneously searching for blanks between the signals recorded on the second side of the recorded tape.

10. The method according to claim 9, wherein the tape player comprises a reversible head component divided into a first head having a plurality of analog playback head sections and a second head having a plurality of digital playback head sections, step (a) comprises searching for blanks between the signals recorded on the first side of the recorded tape using at least one of the analog playback head sections, and step (b) comprises searching for blanks between signals recorded on the second side of the recorded tape using at least one of the digital playback head sections.

11. The method according to claim 9, further comprising the steps of:
   counting how many blanks exist on the recorded tape; and
   displaying information identifying how many blanks exist on the recorded tape.

12. The method according to claim 9, further comprising the steps of:
   detecting locations of the blanks on the recorded tape; and
   displaying information identifying the locations of blanks on the recorded tape.

13. The method accord to claim 9, further comprising the steps of:
   counting how many blanks exist on the recorded tape;
   detecting locations of the blanks on the recorded tape; and
   displaying information identifying how many blanks exist on the recorded tape and the locations of those blanks on the recorded tape.

* * * * *

UNITED STATES PATENT AND TRADEMARK OFFICE
CERTIFICATE OF CORRECTION

PATENT NO. : 5,394,279
DATED : February 28, 1995
INVENTOR(S) : Yoshiki FURUTA

It is certified that error appears in the above-indentified patent and that said Letters Patent is hereby corrected as shown below:

Claim 7, Column 6, Line 19, change "headed" to --tracked--.

Claim 8, Column 6, Line 22, change "signal" to --signals--.

Claim 13, Column 6, Line 59, change "accord" to --according--.

UNITED STATES PATENT AND TRADEMARK OFFICE
CERTIFICATE OF CORRECTION

PATENT NO. : 5,394,279
DATED : February 28, 1995
INVENTOR(S) : Yoshiki FURUTA

It is certified that error appears in the above-indentified patent and that said Letters Patent is hereby corrected as shown below:

Title page, Change Title : Line 2, change "SIMULTANEOULSY" to --SIMULTANEOUSLY--.

Abstract, Front Page, Line 7 after "component" insert --1--.

Claim 2, Column 5, Line 35, change "section" to --sections--.

Claim 3, Column 5, Line 39, change "measure" to --measures--.

Claim 6, Column 5, Line 62, change "sections" to --heads--.

Signed and Sealed this

Thirteenth Day of June, 1995

Attest:

BRUCE LEHMAN

Attesting Officer

Commissioner of Patents and Trademarks